Sept. 28, 1937.   W. E. LEIBING   2,094,405
GOVERNOR WEIGHING MACHINE
Filed Jan. 28, 1935   2 Sheets-Sheet 1
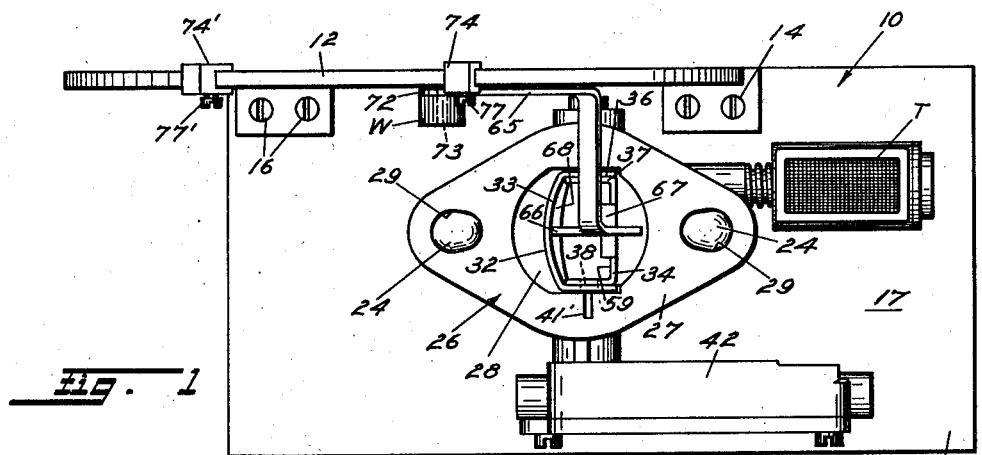
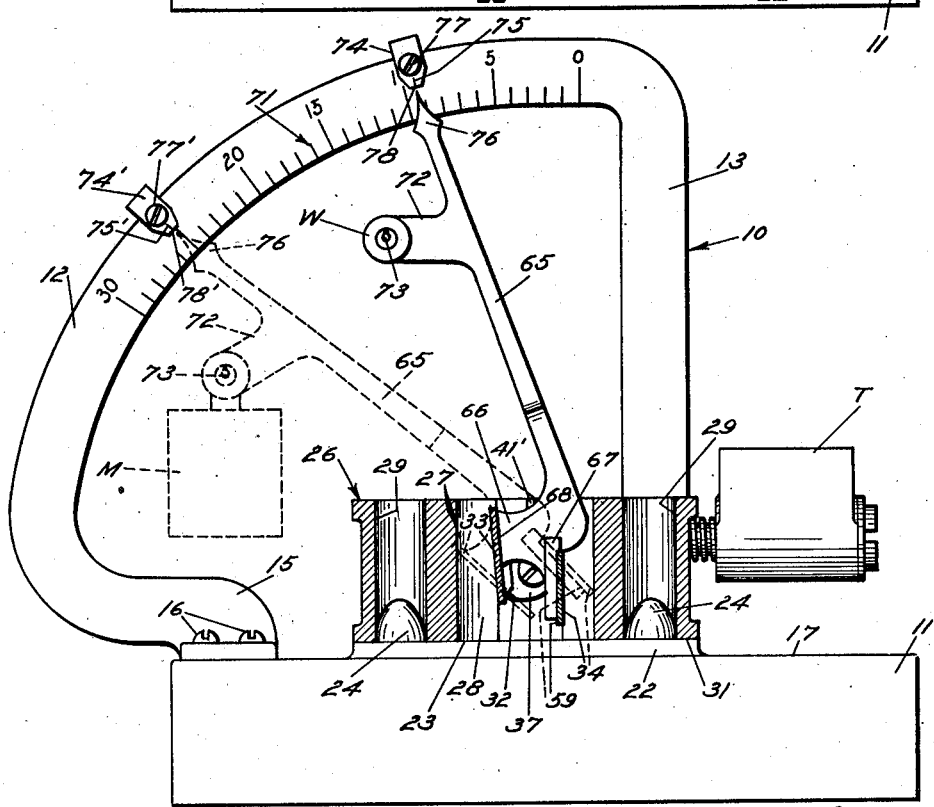
Inventor
William E. Leibing
By Strauch & Hoffman
Attorneys Sept. 28, 1937.  W. E. LEIBING  2,094,405
GOVERNOR WEIGHING MACHINE
Filed Jan. 28, 1935  2 Sheets-Sheet 2
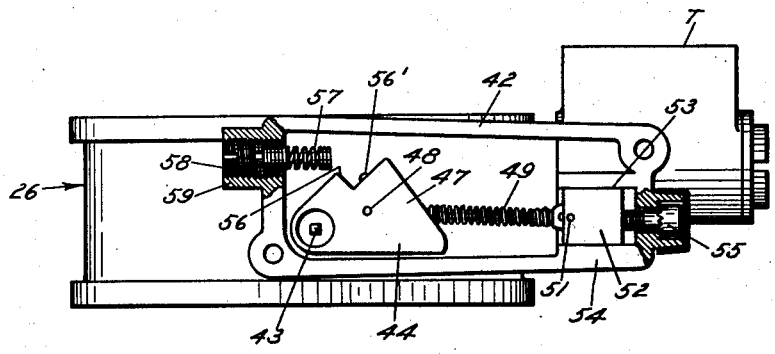
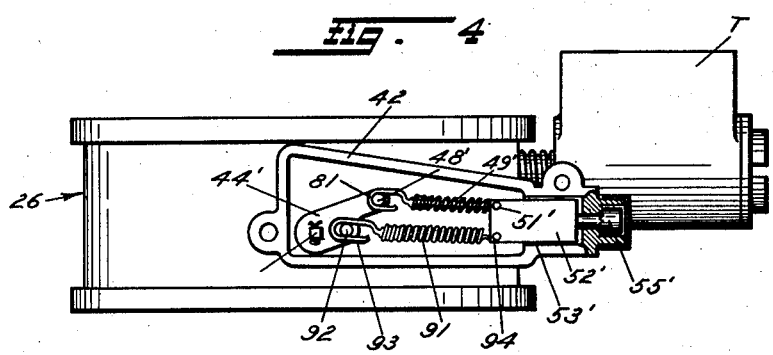
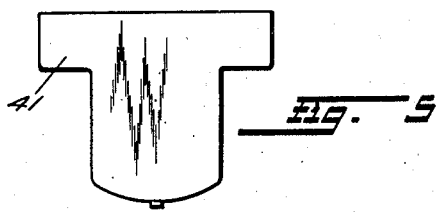
Inventor
William E. Leibing
By Strauch & Hoffman
Attorneys Patented Sept. 28, 1937

2,094,405

UNITED STATES PATENT OFFICE 2,094,405

GOVERNOR WEIGHING MACHINE

William E. Leibing, San Francisco, Calif., assignor to Leibing Automotive Devices, Inc., San Francisco, Calif., a corporation of Nevada Application January 28, 1935, Serial No. 3,864

3 Claims. (Cl. 73—51)

The present invention relates to apparatus for adjusting control devices such as governors of the types used for the control of fluid flow as, for instance, on prime movers, as fuel flow in internal combustion engines, and more particularly to convenient and accurate apparatus for adjusting and setting governors involving elements responsive to a characteristic of fluid flow, such as velocity.

It has heretofore been the practice in the governor art to adjust the adjustable elements of a governor by the use of a dynamometer or by successive trial and adjustment on the prime mover on which the governor is to be employed such as an internal combustion engine. Such methods of adjustment are inconvenient and undesirable since they require an individual treatment of each governor with respect to the dynamometer or prime mover and require considerable time on the part of a mechanic skilled in the governor art.

Moreover, an adjustment of a governor to a prime mover must oftentimes be done in the field, and under such conditions, the services of a skilled mechanic are not always available. It is obviously of great advantage to be able to accurately adjust a governor at the factory for all conditions to which it is to be subject and it is also of great advantage in the factory if the installation and adjustment of each individual governor upon a dynamometer can be eliminated.

In overcoming the disadvantages of the prior art, it is a major object of the present invention to provide a simple and accurate apparatus for the adjustment of governors for fluid flow control whereby the time and skill hitherto expended on such adjustments may be kept to a desirable minimum and proper adjustment be assured.

A further object of the present invention is to provide a novel adjusting apparatus which can be readily calibrated and subsequently employed for the coordination and adjustment of the elements of a governor, thus assuring a predetermined and accurate setting with an assurance of satisfactory operation under all conditions.

Still a further object of this invention is to provide novel apparatus by which a single adjusted governor may be employed as a standard to adjust and set a number of substantially like governors without the necessity of the installation of each of such governors upon a dynamometer or upon the prime mover to be governed with the subsequent use of a trial and adjustment method and the attendant requirement of considerable time on the part of a mechanic skilled in the art.

A further object of the present invention is to provide novel apparatus for the adjustment of governors whereby governors in large numbers may be cheaply and accurately adjusted at the point of manufacture and forwarded for immediate installation upon the device to be employed, such as an internal combustion engine, without the necessity of adjustment.

A further object of the present invention is to provide a novel apparatus for the adjustment and proper operation of various types of governors over their entire range of governing action.

Still a further object of the present invention is to provide a novel apparatus for adjusting a number of substantially like control devices wherein one of said devices is adjusted by actual trial under the conditions to be controlled, and the remaining devices are adjusted in accordance with the adjustment of the adjusted device.

A further object of the present invention is to provide a novel apparatus for the adjustment of a number of substantially like governors wherein the adjustments of a number of governors may be readily and accurately set to agree with the adjustments of an adjusted governor which has been set up as a standard.

Still a further object of this invention is to provide a novel apparatus for adjusting a number of substantially like governors for the control of fluid flow wherein one governor is inserted in the fluid flow to be governed and adjusted according to its various positions and various types of fluid flow, the adjustments of the one governor being subsequently set up as standards for the adjustment of substantially like governors and the remaining governors adjusted accordingly.

Still a further object of the present invention is the provision of novel apparatus for the adjustment of a governor for fluid flow control wherein a rotary valve is employed responsive to a characteristic of fluid flow, means being provided for the simulation of predetermined conditions of fluid flow by an application of predetermined torques to the valve whereby the governor may be adjusted in coordination with desired positions of the valve under the simulated flow conditions.

Further objects of the present invention will appear as the following description and appended claims are read in connection with the accompanying drawings wherein:

Figure 1 is a plan view of an embodiment of the present invention illustrating a device for the adjustment of a governor with a governor shown thereon in position for adjustment.

Figure 2 is a front elevation of the device shown in Figure 1 with the governor shown partially in section to illustrate the elements of the device that cooperate therewith.

Figure 3 is an elevation of the governor shown in Figure 2 with the cover for the adjusting mechanism removed.

Figure 4 is an elevation similar to Figure 3 but showing a different type of governor wherein a different adjusting means is employed.

Figure 5 is an elevation of an element of the governors of Figures 3 and 4 which is removed prior to adjustment on the apparatus shown.

With specific reference to Figures 1 and 2 of the drawings, a preferred embodiment of the apparatus of the present invention is shown and designated generally by reference numeral 10.

The apparatus shown comprises a base or supporting block 11 upon which an arcuate-shaped segment 12 is adapted to be rigidly mounted. Segment 12 is provided with a leg 13 extending downward from the extreme end thereof and secured to base 11 by any suitable means such as screws 14. At its other end, segment 12 is provided with a substantially horizontal leg 15, which is secured to base 11 as by screws 16. In order that the planes of engagement of legs 13 and 15 with base 11 may be on substantially the same level, the upper surface 17 of base 11 is preferably finished as a plane surface.

Base 11 is provided with an upstanding boss or table 22 which is preferably centrally disposed of the base. The upper surface 23 of table 22 is preferably machined in a plane substantially parallel to the surface 17. Two upstanding protuberances or lugs 24 are provided on the surface 23 and in fixed relation thereto for a purpose that will presently appear.

A governor generally indicated at 26 is shown in Figures 1 and 2 as mounted on the device 10 for adjustment. It will be understood that many types of governors may be adjusted by the present apparatus, but for the purposes of illustration, only two forms of governors are being described which are both governors of the velocity type. It is to be understood, however, that other devices and other types of governors may be adjusted by the present apparatus.

Governor 26 comprises a body portion 27 having a fuel passage 28 therethrough and bolt apertures 29. The governor is placed upon table 22 in an inverted position with protuberances 24 engaging apertures 29 whereby the governor is accurately and predeterminedly positioned with respect to the remainder of the adjusting mechanism. Protuberances 24 are so related to apertures 29 that the lower face 31 of governor 26 will lie flat upon face 23 of table 22, and each governor of a like type that is placed thereon will assume the same position.

Governor 26 is provided with a valve 32 comprising a scoop-shaped vane 33 and a stabilizing vane 34 as disclosed in copending application 614,533, filed May 31, 1932. Vanes 33 and 34 are formed with offset ears 36 and 37 respectively. Ears 36 are of a dimension to snugly receive ears 37, both sets of ears being provided with apertures 38 which receive suitable pivot pins or shafts, said shafts being preferably arranged to rotate with vanes 33 and 34.

A bridge member 41 (Figure 5) is arranged to be positioned in grooves 41' formed in the walls of aperture 28. Bridge 41 divides passage 28 and provides a stop to prevent valve 32 from being rotated in a clockwise direction (Figure 2) to closed position under the influence of the resilient means to be described. When a governor of the type disclosed is to be adjusted by means of the device shown in Figures 1 and 2, bridge 41 is removed and replaced after the adjustment has been completed. Since bridge 41 is secured only by grooves 41', its removal and replacement is a relatively simple operation.

A throttle cheat device is generally indicated at T but as it forms no part of the present invention, no description thereof is deemed necessary. For a detailed description thereof, reference is made to copending application Serial No. 738,114 filed August 2, 1934.

One of the valve supporting shafts extends beyond body 27 into a casing 42 (Figures 1, 3 and 4) preferably formed integrally with body 27. The protruding end 43 of the shaft is preferably formed of square shape and is arranged to receive a segment 44. Thus segment 44 through the squared portion 43 of the shaft is arranged to rotate with the shaft and with valve 32. A portion of the material between the lower sides of segment 44 is removed to form ears 47 through which a pin 48 is passed to receive one end of a spring 49. The opposite end of spring 49 is secured to a pin 51 mounted in a block 52 which is slidably positioned in a guide 53 formed on a boss 54 preferably integral with casing 42. Block 52 is suitably bored and tapped to receive an adjusting screw 55 which is accessible from the exterior of the casing 42 in order to adjust the tension of spring 49.

Segment 44 is also provided with a notched corner 56 having a projection 56' thereon which is arranged to engage a spring 57 upon the counter-clockwise rotation of segment 44, shaft 43 and valve 32. Spring 57 is suitably mounted on a screw 58 threaded through a boss 59. Thus screw 58 is arranged to displace spring 57 longitudinally of boss 59 in order to vary the point of contact between segment 44 and spring 57. Since segment 44 is secured for rotation with shaft 43, it follows that the variation of tension in spring 49 and the displacement of the point of contact between segment 44 and spring 57 will vary the resistance to the rotation of valve 32 in a counter-clockwise direction or into closed position as regards conduit 28.

As heretofore pointed out, the governor disclosed in connection with the adjusting device of Figures 1 and 2 for the purpose of illustration is of the velocity type. That is valve 32 is automatically operated in accordance with the velocity of the fluid passing through passage 28 and impinging upon the vanes thereof. It will therefore be apparent that by varying the tension of spring 49, control of the fluid flow may be varied and hence the speed of the prime mover or other characteristic of the device upon which the governor is mounted may be varied. Also the displacement of the point at which segment 44 engages spring 57 will determine the point at which spring 57 will augment the action of spring 49 and as a consequence control the action of valve 32, in turn affecting the flow of fluid. However it has been found that spring 57 need be given only an initial adjustment and only spring 49 need be adjusted to vary the setting of the governor. For a more specific description of the governor disclosed, attention is directed to my copending applications, Serial No. 614,533 filed May 31, 1932, Serial No. 659,893 filed March 6, 1933 and Serial No. 738,114 filed August 2, 1934.

With the governor in position on protuberances 24 as shown in Figures 1 and 2 and with the bridge 41 removed, a pointer or lever 65 having legs 66 and 67 is placed in position on valve 32. Leg 66 is arranged to lie upon face 68 of member 33 and leg 67 upon face 59 of member 34, the legs 66 and 67 being arranged in such a manner that the pointer will be positively rotated about the axis of the valve pivots with the valve 32 and will be fixedly retained during such rotation within the angle formed between members 33 and 34 of valve 32.

Arcuate segment 12 is preferably provided with suitable indicia as a scale 71 which may be graduated if desired in ounces, pounds or any arbitrary division selected. Preferably the zero point of the scale is located at the point to which pointer 65 swings when the valve 32 and segment 44 are free of spring influence and bridge 41 is removed. An arm 72 is integrally formed on pointer 65 and a knife edge 73 is formed on the extremity of arm 72, knife edge 73 being preferably mounted on a pin mounted to rotate in a hole in the end of arm 72 whereby the knife edge may be maintained in its correct position regardless of the position of pointer 65.

In using the apparatus embodying the present invention, a governor of the type to be adjusted is first placed upon a dynamometer or upon a prime mover and correctly adjusted as desired in well known manner. The adjusted governor is placed in position upon table 22 with the apertures 29 thereof receiving lugs 24, the bridge 41 being first removed from the governor. Pointer 65 is then placed in position in valve 32. An adjustable weight W, preferably equal or slightly above the forces exerted by the flow of fluid through passage 28 of the governor at idling speed of the prime mover or other mechanism upon which the governor is to be employed, is placed on knife edge 73, causing pointer 65 to swing to some point on scale 71. This point, as indicated by pointer 65, will correspond to the tension determined for spring 49 by the dynamometer and constitutes the starting point from which like governors are to be adjusted and preferably represents the point at which valve 32 is approximately in wide open position. An adjustable clip 74 having an index mark 75 thereon is placed upon segment 12 with the mark 75 in alignment with the tip 76 of pointer 65.

A set screw 77 is provided to retain clip 74 in its adjusted position. The edge 78 of clip 74 is preferably made of a predetermined width and serves to indicate the tolerance allowed for adjustment of spring 49.

Assuming that clip 74 has been set in clamping position by means of set screw 77, weight W is removed and a larger weight M is placed upon knife edge 73.

Weight M is selected so that the torque exerted by it in combination with arm 65 is equal to the torque exerted upon valve 32 when the desired maximum fluid flow through the governor has been attained. The force thus exerted by weight M will be just sufficient to completely close valve 32 in the same manner as the forces exerted by the flow of mixture through the passage 28 in the case of an internal combustion engine will close valve 32 at the governed motor speed when the governor is in actual operation in an internal combustion engine. By reason of the weight M, pointer 65 will swing over scale 71 to a second position as indicated in dotted lines in Figure 2 which will indicate the fully closed position of valve 32 under the desired conditions.

A second clip 74' is positioned at this point in alignment with the dotted line position of pointer 65, and screw 77' is screwed down to clamp clip 74' in position. Since springs 49 and 57 of the governor utilized have been accurately adjusted by means of the dynamometer or a prime mover, the position of clips 74 and 74' upon segment 12 will accurately determine the spring settings necessary for the proper adjustment of other substantially like governors.

The governor adjusted upon the dynamometer and by which the device is calibrated is now removed and a governor 26 which has not been adjusted is placed upon table 22 with the bridge 41 thereof removed. Pointer 65 is then placed in position upon members 33 and 34 in the manner previously described and the weight W is positioned upon knife edge 73. With the parts in this position, adjustment screw 55 of the new governor is actuated to move block 52 along guide 53 until pointer 65 is opposite mark 75 or within the permitted tolerance as indicated by the width of portion 78 of the clip 74. Since but one type of governor is adjusted after a single setting of the adjusting mechanism, and the springs employed in the governors are substantially equal in length, diameter and wire size, the governors are substantial duplicates of one another and the tension of the spring 49 in each will be substantially equal to that of the spring 49 of the governor originally adjusted on the dynamometer or prime mover. After proper adjustment of spring 49, the position of valve 32 will therefore be the same as that of valve 32 of the governor first placed in the instrument and adjustment of the governor can be accurately made.

After proper adjustment of the adjusting screw 55, weight W is removed and weight M placed in position on knife edge 73 causing the pointer to swing to a point lower on the scale 12. Screw 58 is moved until pointer 65 is brought opposite mark 75' or within the permitted tolerance as indicated by the width of edge 78' of clip 74'. When pointer 65 and mark 75' are substantially aligned by adjustment of screw 58, the closed or maximum speed position of the valve 32 is determined.

Since the elements of the instrument disclosed are relatively rigid and strong as regards the use to which they are put and no delicate mechanisms are involved, the instrument cannot be forced out of adjustment due to repeated use in the manner above outlined. Due to the relatively long length of pointer arm 65, very accurate adjustments may be made and all the governors adjusted will be found to be substantial duplicates in characteristics. It will therefore be seen that the calibration of a number of governors may be made in a very rapid and accurate manner by comparatively unskilled employees.

In Figure 4, a modified adjustment means for a governor is disclosed for a more complete description of which attention is directed to copending application Serial No. 614,533 filed May 31, 1932. In this type of governor, the valve shaft is provided with a segment 44'. Segment 44' is provided with a pin 48'. A spring 49' is connected to pin 48' at one end by means of a hooked member 81, the opposite end of spring 49' being secured to a pin 51' secured in an adjusting block 52' mounted in guide 53'. Adjusting block 52' is arranged to be displaced as desired by adjusting screw 55' in the manner heretofore described in connection with the governor of Figure 3.

It will be noted that the adjustment means of the two types of governors shown are quite similar, the main difference in the two devices residing in the elimination of spring 57 and its associated elements. In lieu thereof, a spring 91 is provided in the governor of Figure 4, one end of which is secured to a pin 92 carried by segment 44'. The connection to pin 92 is made by a lost motion connection formed by providing relatively elongated loop member 93. The opposite end of spring 91 is secured to a pin 94 carried by block 52'. As viewed in Figure 4 in which the governor is shown in wide open position, spring 91, due to the lost motion connection 93, does not exert any pull on segment 44' until the valve is partially closed. There is but a single adjustment i. e. by screw 55'. Therefore only one position of valve 32 need be determined.

In adjusting the type of governor disclosed, adjusting bolt 55' provides the sole adjustment. Therefore by properly determining the force required to close valve 32 in this form of governor when on a dynamometer or prime mover and setting clip 74 in the position determined thereby, the device of the present invention may be used to properly adjust a governor requiring only one adjustment.

From the foregoing description, it will be evident that the present invention provides relatively simple and accurate apparatus for the adjustment of governors, particularly in mass production. The services of skilled mechanics are virtually eliminated in that the apparatus is such that large numbers of governors can be quickly calibrated by a relatively inexperienced workman. It is to be understood that the invention is not limited to application to governors of a single type but may obviously be extended to other types of governors and governing mechanisms, particularly in the field of fluid flow control.

It is to be further understood that the apparatus of the present invention is adapted to the adjustment of control devices other than governors, the latter having been chosen herein for the purposes of illustration. Any control device embodying adjustable features can readily be adjusted in large quantities by the apparatus disclosed herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for the adjustment of automatic flow control devices involving a valve responsive to a characteristic of fluid flow and a plurality of adjustable means resiliently opposing movement of said valve in response to said characteristic comprising a base for supporting a flow control device in a predetermined position, an arm arranged to positively engage the valve of said flow control device and move therewith, means whereby different forces tending to move said arm may be applied thereto, said forces being determined in accordance with predetermined conditions of fluid flow and predetermined valve positions, a scale fixed to said base and associated with said arm in a manner whereby the arm acts as a pointer therefor, and means on said scale to indicate the proper position of said arm when said adjustable means is properly adjusted with respect to said predetermined conditions of fluid flow and predetermined valve positions.

2. An apparatus for the adjustment of automatic flow control devices involving a valve responsive to a characteristic of fluid flow and adjustable means to resiliently oppose the movement of said valve in response to said characteristic comprising a base, means on said base to receive and predeterminately position a flow control device to be adjusted, an arcuate-shaped scale on said base, an arm arranged to be secured to the valve of said flow control device and rotate therewith, said arm being extended to cooperate with said scale as a pointer, means whereby the torque on said arm may be varied, and adjustable means on said scale to indicate desired positions of said arm when said control device is properly adjusted.

3. An instrument for the adjustment of a fluid flow control device involving a valve responsive to a characteristic of fluid flow comprising a base, a graduated member supported on said base, means for positioning said fluid flow control device in predetermined relation to said member, a pointer arranged to move with said valve and to cooperate with said member, and means whereby forces of predetermined magnitude may be applied to said valve tending to close said valve to simulate predetermined conditions of fluid flow.

WILLIAM E. LEIBING.